(12) United States Patent
Lebedev et al.

(10) Patent No.: US 9,383,444 B2
(45) Date of Patent: Jul. 5, 2016

(54) SYSTEM AND METHOD FOR FINDING FISH USING A SONAR FISHING FLOAT WIRELESSLY COUPLED TO A REMOTE COMPUTING DEVICE

(71) Applicants: Alexander Lebedev, Seattle, WA (US); Tim Etchells, Seattle, WA (US); Nicholas Vallidis, Seattle, WA (US); Alan Widmer, Seattle, WA (US)

(72) Inventors: Alexander Lebedev, Seattle, WA (US); Tim Etchells, Seattle, WA (US); Nicholas Vallidis, Seattle, WA (US); Alan Widmer, Seattle, WA (US)

( * ) Notice: Subject to any disclaimer, the term of this patent is extended or adjusted under 35 U.S.C. 154(b) by 72 days.

(21) Appl. No.: 14/558,319

(22) Filed: Dec. 2, 2014

(65) Prior Publication Data

US 2015/0085602 A1 Mar. 26, 2015

Related U.S. Application Data

(63) Continuation-in-part of application No. 13/552,250, filed on Jul. 18, 2012, now Pat. No. 8,934,318.

(51) Int. Cl.
*G01S 15/96* (2006.01)
*G01S 7/00* (2006.01)

(52) U.S. Cl.
CPC ........ *G01S 15/96* (2013.01); *G01S 7/003* (2013.01)

(58) Field of Classification Search
CPC ................................ G01S 7/003; G01S 15/96
See application file for complete search history.

(56) References Cited

U.S. PATENT DOCUMENTS

| | | | | |
|---|---|---|---|---|
| 4,084,150 | A * | 4/1978 | Massa | G01S 15/18 367/155 |
| 7,120,170 | B2 * | 10/2006 | Ali | H04N 21/647 370/503 |
| 2003/0118056 | A1 * | 6/2003 | Ali | H04N 1/4305 370/503 |
| 2004/0004904 | A1 * | 1/2004 | Betts | A01K 93/02 367/3 |
| 2013/0208568 | A1 * | 8/2013 | Coleman | G01S 7/521 367/88 |
| 2015/0085602 | A1 * | 3/2015 | Lebedev | G01S 15/96 367/3 |
| 2015/0294660 | A1 * | 10/2015 | Stokes | G01S 15/96 367/173 |

* cited by examiner

*Primary Examiner* — Daniel Pihulic
(74) *Attorney, Agent, or Firm* — James M. Smedley LLC; James Michael Smedley, Esq.

(57) ABSTRACT

A sonar fish finding system includes at least one sonar device which attaches to a fishing line and floats on the water like a fishing bubble, float, or bobber. The at least one sonar device pairs with a wireless computing device over a Bluetooth connection to provide information to a fisherman about what is under the surface of the water proximal to the at least one sonar device. Processing may be performed incrementally on subsets of sonar data samples in order to allow for a complete result without requiring storage of the entire set of data samples at once. The at least one sonar device is configured to send the sonar data samples to a remote computing system either directly or indirectly through a wireless computing device. Based on the received sonar data samples, the remote computing system may send the wireless computing device information about both real-time fishing hotspots, and predicted fishing hotspots based on historical data and current conditions.

18 Claims, 13 Drawing Sheets

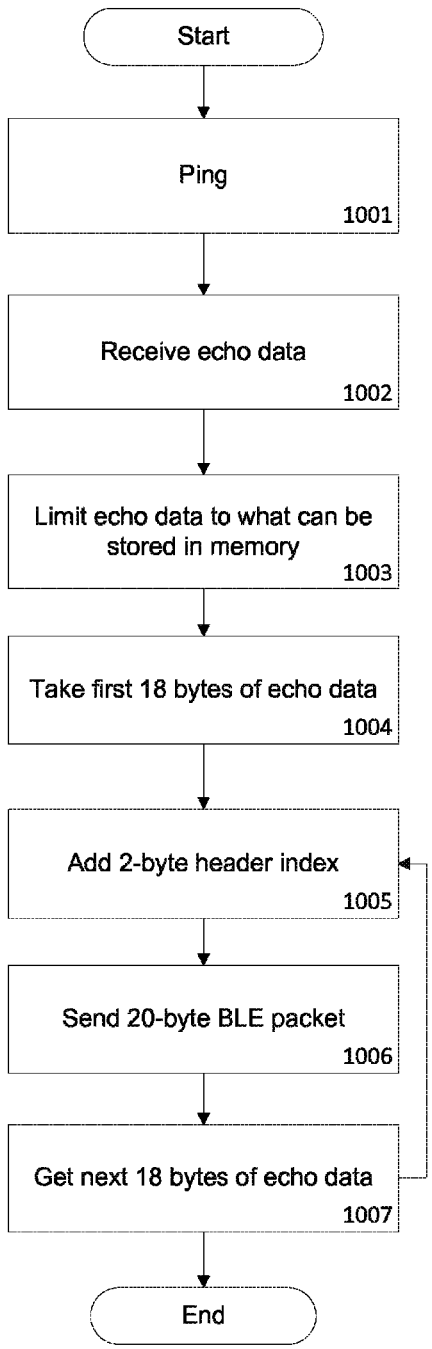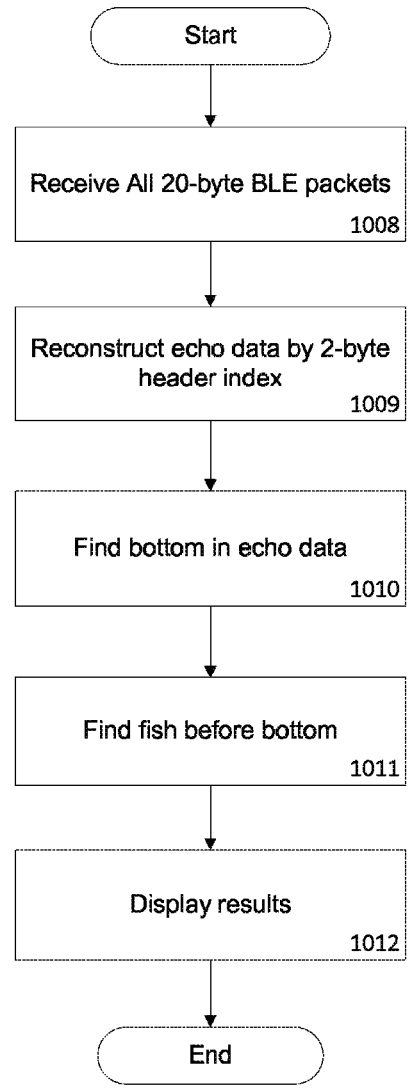
FIG. 10A
FIG. 10B

SYSTEM AND METHOD FOR FINDING FISH USING A SONAR FISHING FLOAT WIRELESSLY COUPLED TO A REMOTE COMPUTING DEVICE

FIELD OF THE INVENTION

The present invention generally relates to a sonar fish finding system. Specifically, this invention relates to a sonar device which attaches to a fishing line and floats on the water like a fishing bubble, float, or bobber. The sonar device pairs with a wireless computing device over a Bluetooth Smart (also known as Bluetooth Low Energy) connection to provide information to a fisherman about what is under the surface of the water. In some embodiments, processing may be done on subsets of sonar data samples in order to allow for processing a complete result without requiring storage of the entire set of data samples at once. In certain embodiments of the present invention, the sonar device sends data to a remote computing system either directly or indirectly through a wireless computing device. The remote computing system also sends the wireless computing device information about both real-time fishing hotspots, and fishing hotspots predicted based on historical data and current conditions.

BACKGROUND OF THE INVENTION

For centuries, fishermen have been looking for ways to improve their chances for catching fish. Over the years, there have been developments in lures, rods, reels, and a variety of other equipment that have made fishermen more successful. Over the past two decades, however, sonar fish finding systems have become increasingly available and fishermen have taken advantage of the benefits those systems offer.

Sonar fish finding systems are available in a variety of forms and functionalities, which give fisherman a broad choice as to what product fits their specific needs. In more recent times, sonar fish finding systems that can pair the sonar fish finding device together with the numerous wireless computing devices that fishermen and others already use every day have become available to the public. Such an arrangement allows a fisherman to utilize an already existing display screen rather than having to have one that is dedicated to the sonar fish finding alone.

These sonar fish finding devices currently available, however, do have limitations, specifically in relation to the sonar fish finding devices that pair a sonar fish finder with a wireless computing device. Currently available sonar fish finding systems do not offer the capacity for fishermen to track real-time fishing hotspots. Such a limitation can decrease a fisherman's ability to successfully catch fish, as the fisherman is unaware where fish are actually located and therefore must use valuable time to search for the fish.

Further, currently available sonar fish finding systems do a considerable amount of data processing on-board the sonar device. This on-board processing requires significant processing hardware which, in turn, requires increased battery capacity. Therefore, these kinds of devices tend to be either bulky or have battery life of only a few hours. In order to enable all day use on a single charge, the size, complexity, and power of the electronics in the sonar device must be significantly reduced. However, reducing the processing power of the electronics brings its own challenges. Memory capacity and processing speed constraints inherent in low-power electronics impose serious limitations on the capabilities of the sonar device.

Sonar devices work by emitting a sonic signal which echoes or reflects off objects in the water. A sensor records these reflections for processing to find fish or objects in the water. In certain situations, the memory capacity of low-power electronics is insufficient for storing the data set of the whole reflected signal. This can limit the ability of the sonar device to see to the end of the full range of the sonic signal. However, even under tight memory constraints, it is possible to process the whole range of the reflected signal without having to store the whole data set at once. Methods of allowing for full service data processing, even where limited bandwidth, memory, and processing power are available are generally applicable to many types of data processing.

Even with low power electronics, sending information over a standard wireless connection can cause a significant drain on the battery, reducing battery life. Power consumption can be further reduced by using, for example, a Bluetooth Smart (BLE) connection. However, BLE imposes constraints on the system that make sending large amounts of data somewhat difficult. This problem can be addressed through careful construction of BLE data packets.

Therefore, there is a need in the art for a sonar fish finding system and method that allows for a small sonar device, roughly the size of a fishing bobber, with all-day battery life. This need can be met by using low-power electronics, a BLE wireless connection, and clever engineering to squeeze the maximum amount of useful data through limited resources. Useful data is further provided by gathering data from multiple sonar devices at a remote computing system that does not have the processing constraints of the sonar device and determining fishing hotspots based on both current and historical data. Fishing hotspot information can then be sent back to a wireless computing device. These and other features and advantages of the present invention will be explained and will become obvious to one skilled in the art through the summary of the invention that follows.

SUMMARY OF THE INVENTION

Accordingly, it is an object of the present invention to provide a system and method for fish finding using a low-power sonar device, wireless communications, and a remote computing system to determine current and predicted fishing hotspots.

According to an embodiment of the present invention, a fish detection system comprises a sonar fishing float, the sonar fishing float comprising: a bottom-facing sonar transducer, a sonar sensor, a processor, a wireless communication means, and a housing, wherein the housing is configured to contain the bottom sonar transducer, the sonar sensor, the processor, and the wireless communications means, wherein the bottom sonar transducer is configured to direct sonar signals directly below the sonar fishing float, and wherein the wireless communication means is configured to transmit sonar data received from the sonar sensor.

According to an embodiment of the present invention, the fish detection system further comprises a second bottom-facing transducer arranged concentrically with the first bottom-facing transducer, wherein the second bottom-facing transducer generates a ping that is a different frequency and/or beam width than the first bottom facing transducer.

According to an embodiment of the present invention, the fish detection system further comprises: a side sonar transducer, and an electronic compass, wherein the side sonar transducer is configured to direct a sonar signals at an angle relative to the bottom sonar transducer, wherein the electronic compass is configured to provide cardinal direction data relating to the sonar fishing float, wherein the processor is configured to process the cardinal direction data with sonar data received from the sonar sensor to produce processed sonar data such that at least part of the processed sonar data is associated with an orientation direction, and wherein the wireless communication means is configured to transmit the processed data.

According to an embodiment of the present invention, the orientation direction is a cardinal direction.

According to an embodiment of the present invention, the processor is a microprocessor system on chip (SOC) with memory and the wireless communications means built in to the SOC.

According to an embodiment of the present invention, the fish detection system further comprises a gyroscopic sensor, wherein the gyroscopic sensor is configured to generate pitch and/or roll data, wherein the processor is further configured to process the pitch and/or roll data to associate at least part of the processed sonar data with pitch and/or roll data.

According to an embodiment of the present invention, a data set larger than 18 bytes is transmitted over the wireless communication means in a plurality of data packets, each data packet comprising 18-bytes of the data set and a 2-byte index.

According to an embodiment of the present invention, the 2-byte index is an array index value for an array of 16-bit words.

According to an embodiment of the present invention, two or more of the data packets are transmitted over a single communications channel within a time interval of less than 4 seconds.

According to an embodiment of the present invention, the wireless communication means complies with the standard defined by the IEEE Bluetooth Smart communications standard.

According to an embodiment of the present invention, the wireless communications means utilizes a wireless connection timeout period that is longer than the time required for the sonar sensor to receive sonar data.

According to an embodiment of the present invention, the wireless communications means is turned off when the sonar sensor is receiving sonar data.

According to an embodiment of the present invention, a data set representing a complete reflected sonar signal is created by generating a plurality of pings, recording a different portion of the reflected signal from each of the plurality of pings, and transmitting the recorded portion before recording another portion.

According to an embodiment of the present invention, a method for transmitting a data set larger than 18-bytes over a Bluetooth Smart (BLE) wireless connection comprises the steps of: selecting 18 bytes of data from the data set, appending a 2-byte index to the beginning or end of the 18 bytes to create a data packet, transmitting two or more of the data packets during a single connection event within a time interval of less than 4 seconds.

According to an embodiment of the present invention, the 2-byte index is an array index value for an array of 16-bit words According to an embodiment of the present invention, a method for processing data in limited memory or limited bandwidth environments comprises the steps of: causing a source signal to be generated, receiving a portion of the source signal that is less than the whole source signal, causing the source signal to be generated again, recording a different portion of the source signal that is less than the whole source signal.

According to an embodiment of the present invention, the method further comprises the step of processing each portion before receiving the next portion.

According to an embodiment of the present invention, the method further comprises the step of transmitting each portion before receiving the next portion.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 10A is a flowchart illustrating the process of creating data packets for transmission over a Bluetooth Smart connection to optimize data transmission according to an embodiment of the present invention.

FIG. 10B is a flowchart illustrating the process of receiving data packets over a Bluetooth Smart connection and reassembling the full data set according to an embodiment of the present invention.

DETAILED SPECIFICATION

The present invention generally relates to a sonar fish finding system. Specifically, this invention relates to a sonar device which attaches to a fishing line and floats on the water like a fishing bubble, float, or bobber. The sonar device pairs with a wireless computing device over a Bluetooth Smart (also known as Bluetooth Low Energy) connection to provide information to a fisherman about what is under the surface of the water. In some embodiments, processing may be done on subsets of sonar data samples in order to allow for processing a complete result without requiring storage of the entire set of data samples at once. In certain embodiments of the present invention, the sonar device sends data to a remote computing system either directly or indirectly through a wireless computing device. The remote computing system also sends the wireless computing device information about both real-time fishing hotspots, and fishing hotspots predicted based on historical data and current conditions.

According to an embodiment of the present invention, a sonar fish finding system may include a sonar device connected to a wireless computing device by a wireless connection. The system is designed to assist a fisherman in finding fish by communicating information collected by the sonar device to the wireless computing device. In addition to communicating with a wireless computing device, the sonar device may also send data to a remote computing system. The remote computing system gathers data from multiple sonar devices correlates the data with geographic location and weather or other seasonal data, and records a history of data gathered. The remote computing system can then use the sonar data from multiple sonar devices to determine hotspots for the current location of fish in a particular body of water, or predict hotspots for the location of fish based on historical data and correlated with other environmental data. Hotspot data is then sent to personal computing devices of users.

According to an embodiment of the present invention, the sonar device includes a wireless communication means. The wireless communication means is connected to the processor so that the processed information can be transmitted to the wireless computing device. In a preferred embodiment, the wireless communications means may be Bluetooth Smart (BLE). In other embodiments, wireless communications means may include, but are not limited to, WI-FI, Bluetooth, ZigBee, Z-Wave, ANT cellular means (e.g., CDMA, GSM) or any combination thereof. One of ordinary skill in the art would appreciate that there are numerous wireless communication means that could be utilized with embodiments of the present invention, and embodiments of the present invention are contemplated for use with any wireless communication means.

Figure 1:
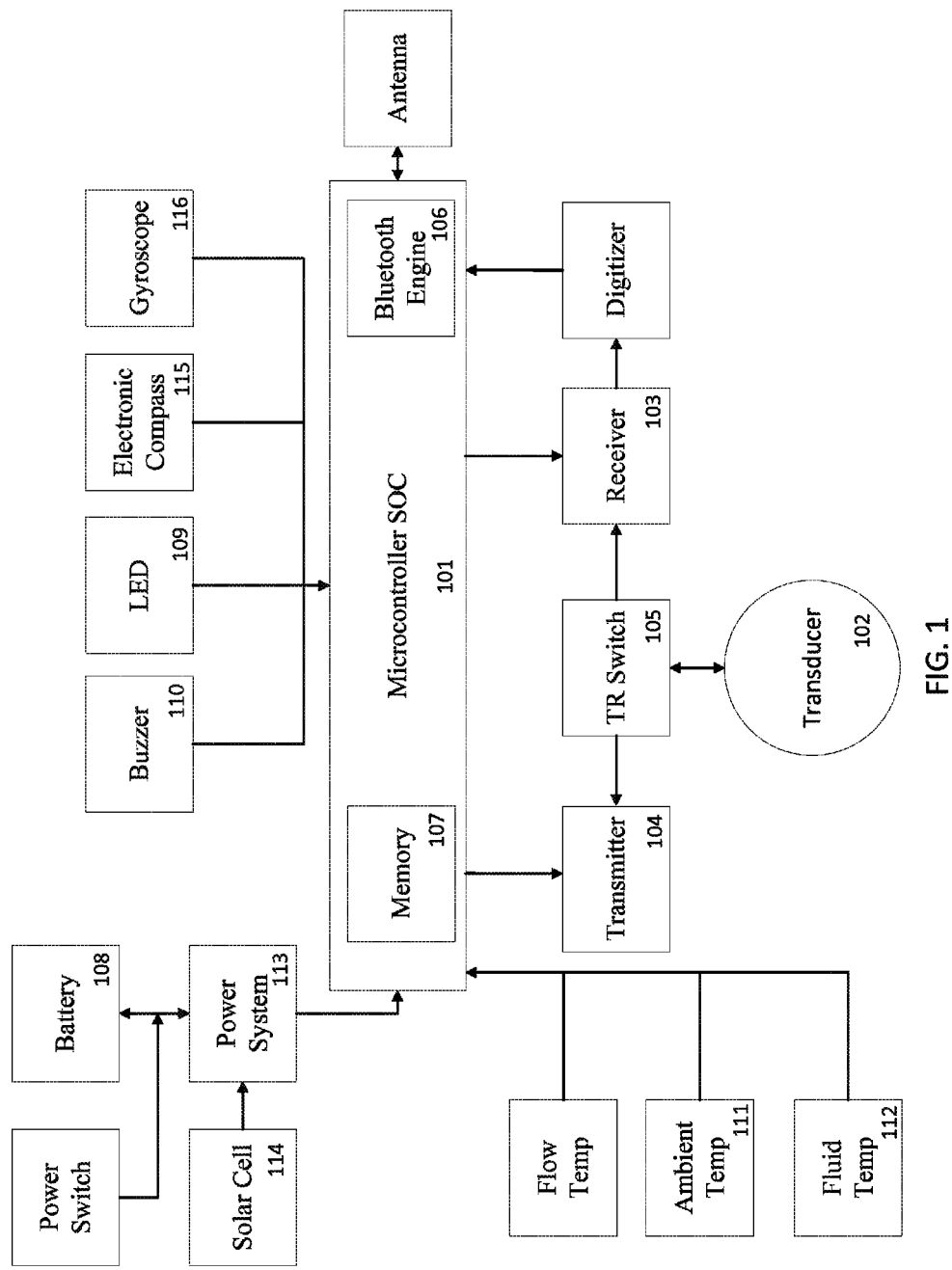
FIG. 1 is a schematic view of the various components of a sonar fishing float according to an embodiment of the present invention.

According to an embodiment of the present invention illustrated in FIG. 1, the sonar device comprises a microcontroller System on Chip (SOC) 101, one or more sonar transducers 102, and one or more sonar receivers 103 or sensors. The sonar transducer 102 and receiver 103 may also be combined in a transceiver. In a preferred embodiment, the transmitter 104 and receiver 103 are connected to the transducer 102 through a Transmit/Receive (TR) switch 105. The TR switch 105 connects the transducer to the transmitter 104 in order to send a sonic signal called a ping. After the ping is sent, the TR switch 105 connects the transducer 102 to the receiver 103 to receive the echo or reflection. One or ordinary skill in the art would recognize that any method or hardware for sending and receiving sonar signals may be used without departing from the spirit and scope of the present invention.

According to an embodiment of the present invention, the sonar device includes a microprocessor System on Chip (SOC) 101 that is communicatively connected to the sonar receiver 103. The connection allows the receiver 103 to provide raw sonar sensor information to the processor. The processor is configured to compute the raw sonar sensor information received from the sonar receiver 103 and translate that information into a usable format. One of ordinary skill in the art would appreciate that there are numerous methods of processing and usable formats that could be utilized with embodiments of the present invention, and embodiments of the present invention are contemplated for use with any processing method or usable format.

According to an embodiment of the present invention, a Bluetooth engine 106 and onboard memory 107 are embedded in the microcontroller SOC 101. This reduces the size, cost and power consumption of the device relative to using discrete components for memory 107 and a Bluetooth engine 106.

According to an embodiment of the present invention, the sonar device further comprises a housing (not shown), one or more sensors, and a power source, such as a battery 108. Optionally, the sonar device may further include an LED indicator light 109, a buzzer 110 for generating an auditory signal or any combination thereof. The one or more sensors of the sonar device may include, but are not limited to, a thermometer for measuring ambient temperature 111, and fluid temperature 112, a speed sensor, an accelerometer, or any combination thereof. One of ordinary skill in the art would appreciate that there are numerous types of sensors that could be utilized with embodiments of the present invention, and embodiments of the present invention are contemplated for use with any type of sensor.

According to an embodiment of the present invention, the sonar device includes a power system 113 with a power source such as a battery 108 and/or a solar cell 114. The power source provides power to the sonar device, including the processor, and wireless communication means, as well as any additional components. In a preferred embodiment, the power sources may be a rechargeable battery. In certain embodiments, the battery may be rechargeable through a wired means. Alternatively, the battery may be recharged through a wireless means. In certain embodiments the power source may be replaceable. In other embodiments, the power source may feature solar recharging or other renewable energy means. The battery may be lithium ion, lithium polymer, nickel cadmium, lead acid, nickel metal hydride, or any kind of rechargeable battery or other energy source. One of ordinary skill in the art would appreciate that there are numerous power sources that could be utilized with embodiments of the present invention and embodiments of the present invention are contemplated for use with any power source.

According to an embodiment of the present invention, the sonar device includes a housing. The housing is configured to retain the sonar transmitter 104, transducer 102, receiver 103, microcontroller SOC 101, wireless communication means, battery 108 or other power source, and any other additional components. In a preferred embodiment, the housing is waterproof and constructed of plastic so that it will float efficiently at the surface of the water. One of ordinary skill in the art would appreciate that there are numerous sizes, shapes, and materials that could be utilized for the housing in the embodiments of the present invention and those embodiments of the present invention are contemplated for use with any of those options.

According to an embodiment of the present invention, the sonar device includes memory 107 embedded in the microprocessor SOC. Having memory embedded on the microprocessor SOC reduces cost, size, and power consumption, and in combination with other features, allows the sonar device to be small and lightweight while still having all-day battery life. In another embodiment, the memory 107 or other storage device may be communicatively connected to the processor in order to provide for the logging of processed information. One of ordinary skill in the art would appreciate that there are numerous storage devices, including hard disk drives, solid state drives, random access memory and flash memory, that could be utilized with embodiments of the present invention and embodiments of the present invention are contemplated for use with any storage device.

According to an embodiment of the present invention, the sonar device may include an one or more indicator lights or LEDs 109 to enable a fisherman to more easily identify the sonar device in the water. In one embodiment, the indicator light could be activated and deactivated remotely from a wireless computing device. In another embodiment, the indicator light could flash when the sonar device becomes disconnected from the wireless computing device, allowing the device to be located. In yet another embodiment, the indicator light could be configured to signal a low battery warning. In yet another embodiment, the LED indicates the presence of fish. Once the sonar device detects fish, it activates the LED to visually indicate the presence of fish. When processing of data is done on the wireless computing device, the wireless computing device sends a notification to the sonar device, which responds by turning on the LED indicator. One of ordinary skill in the art would appreciate that there are numerous forms and functions that indicator light might take on and embodiments of the present invention are contemplated for use with any of those forms and functions.

According to an embodiment of the present invention, the sonar device may include a buzzer 110 or some other means of producing an auditory signal to assist in locating a sonar device when visual contact has been lost. In certain embodiments, the auditory signal could be activated and deactivated remotely from a wireless computing device. In another embodiment, the auditory signal could sound when the sonar device becomes disconnected from the wireless computing device. In yet another preferred embodiment, the auditory signal could be configured to indicate a low battery. In another embodiment, the buzzer indicates the size of detected fish by using different buzzer tones. Tones may differ in frequency, or may pulse at different rates corresponding to the size of fish. One of ordinary skill in the art would appreciate that there are numerous forms and functions that the auditory signal might take on and embodiments of the present invention are contemplated for use with any of those forms and functions.

According to an embodiment of the present invention, the sonar device includes an electronic compass 115 and a gyroscopic sensor 116. The electronic compass 115 and the gyroscopic sensor are described in greater detail with reference to FIG. 5A and FIG. 5B.

Figure 2:
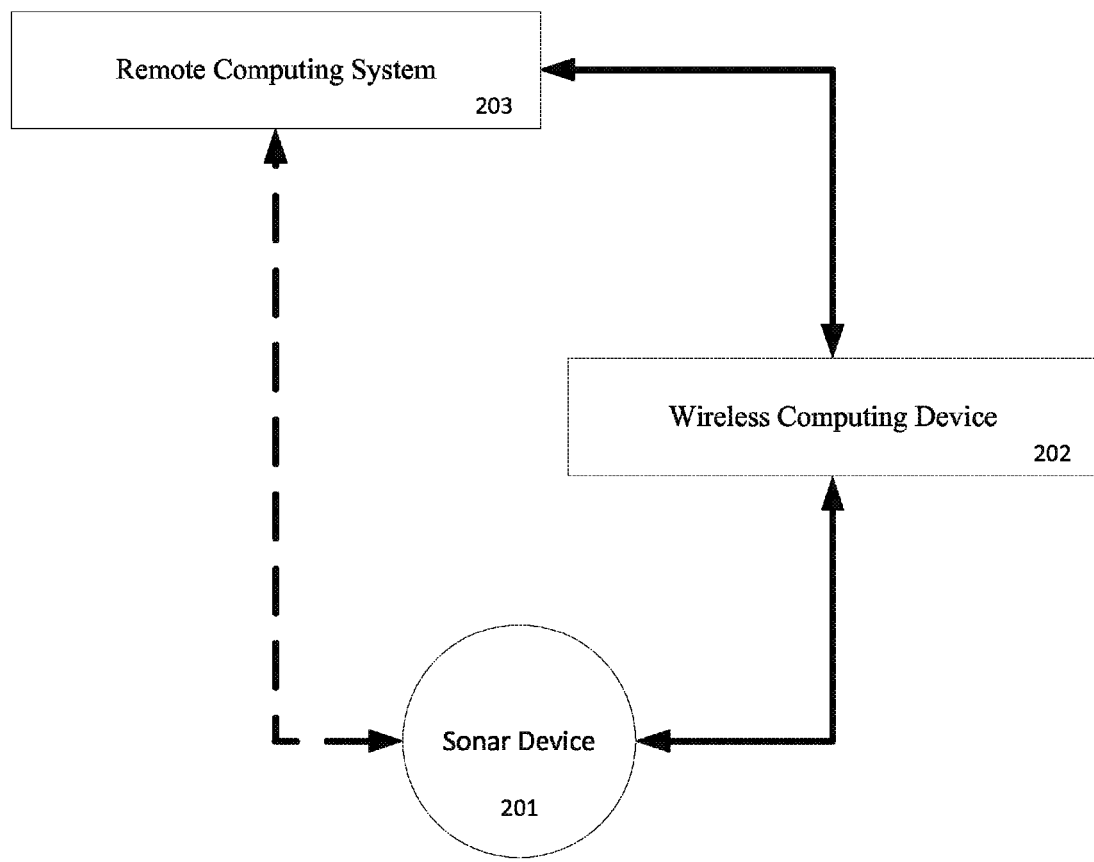
FIG. 2 is a diagram of the overall sonar fish finding system including a remote computing system and a wireless computing device according to an embodiment of the present invention.

According to an embodiment of the present invention illustrated in FIG. 2, the sonar device 201 is connected to a wireless computing device 202 and/or a Remote computing system 203. In a preferred embodiment the sonar device is connected to the wireless computing device 202 through a Bluetooth Smart (BLE) connection, and the wireless computing device 202 is connected to the remote computing system 203 through a Wi-Fi, wireless local area network, cellular network connection or some other network connection. The sonar device 201 may be connected to the remote computing system 203 through the wireless computing device 202, as shown by the solid line, or may be directly connected to the remote computing system 203 as shown by the dashed line. Alternatively, a sonar device may also send data to the remote computing system through a stationary base station. One or ordinary skill in the art would recognize that any method or system for transmitting data from the sonar device to the remote computing system could be used without departing from the spirit and scope of the present invention.

The wireless computing device 202 could be one of any wireless computing devices such as smart phones, PDAs, tablets, or mobile computers that are ubiquitous and readily available from third parties. One of ordinary skill in the art would recognize that nearly any wireless computing device could be used, and the present invention is capable of working with any wireless computing device without departing from the spirit and scope of the present invention.

Figure 3:
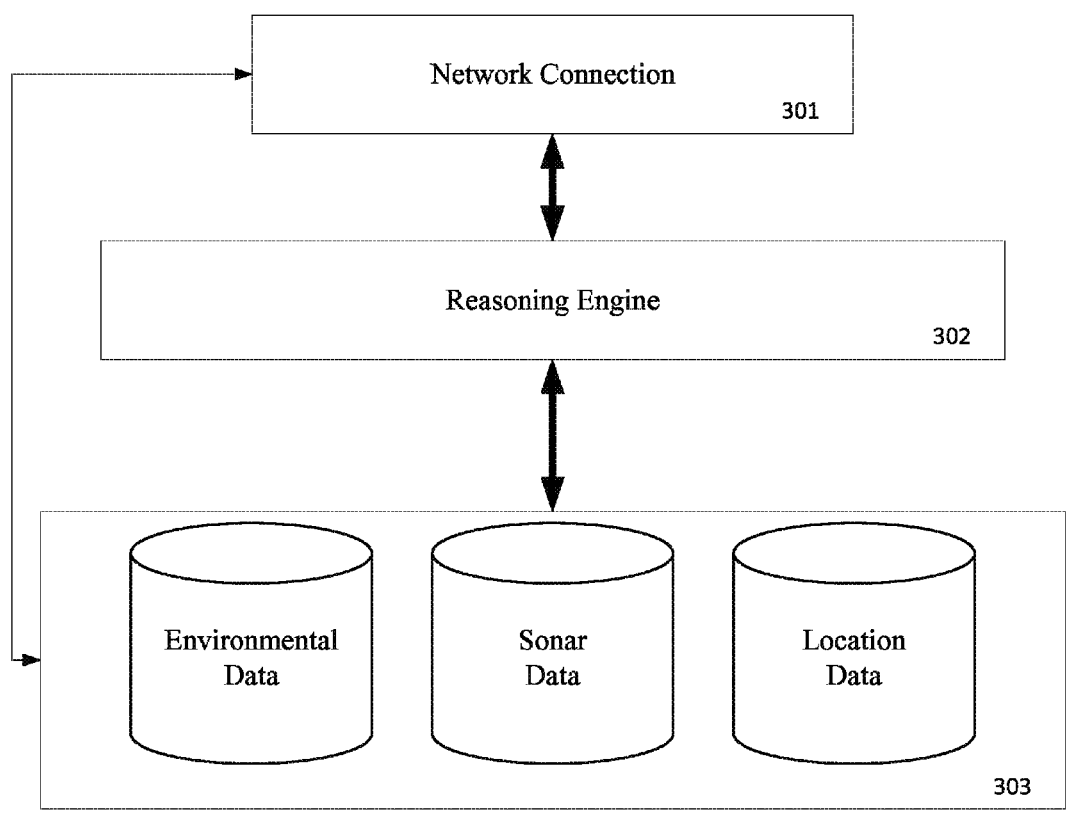
FIG. 3 is a diagram of the remote computing system which aggregates and processes sonar data to determine fishing hotspot information according to an embodiment of the present invention.

FIG. 3 shows a block diagram of one embodiment of the remote computing system 203. The remote computing system 203 includes a network connection 301 for communicating with wireless computing devices 202, sonar devices 201, or third party information providers such as government organizations, fish hatcheries, and weather service providers. A database 303 stores environmental data, sonar data, and location data related to fish found by the sonar devices. The database may also log data related to hotspot information determined by the reasoning engine 302. The database 303 may be incorporated into the remote computing system or be communicatively connected to the remote computing system. The reasoning engine 302 does the necessary processing of data in the database to determine current hotspots based on current sonar data of found fish. The reasoning engine 302 also determines predicted hotspots based on correlations between data of fish found and other fishing data points, including, but not limited to, fish activity, water temperature, water depth, water salinity, air temperature, rainfall, weather conditions, seasonal information, location, lunar phase, restocking schedule from a hatchery, movement patterns of typical fish prey such as insects, etc.

The primary purpose of the remote computing system is to collect data of fish found and other fishing data points and to determine real-time hotspots, and predicted hotspots. According to an embodiment of the present invention, the reasoning engine determines what fishing data points are available. In a preferred embodiment, the reasoning engine would be able to determine what points of fishing data are available from a variety of sources, including, but not limited to, the data store 303 of the remote computing system, data collected in real-time by one or more sonar devices, and information available via the internet from third-party information providers. The reasoning engine analyzes past and present values of various data points and determines hotspot information based upon that analysis. One of ordinary skill in the art would appreciate that there are numerous types of data points that could be utilized to determine hotspot information, and embodiments of the present invention are contemplated for use with any type of data points.

According to an embodiment of the present invention, real-time fishing hotspots may be determined by the reasoning engine by gathering data from multiple sonar devices 201. Data from multiple sonar devices is aggregated by location and it can then be determined which locations have the largest numbers of fish found. This can help fishermen to determine the best spots for fishing based on data of actual fish that are currently found at various locations.

According to an embodiment of the present invention, the reasoning engine can also predict current fishing hotspots based on historical data and other fishing data points that contain information about current conditions. The reasoning engine generates an initial base model based upon the available fishing data points. The base model comprises data points for each independent variable over time with correlations of what states of each variable tend to be associated with the presence of fish. Each available point of fishing data (or any subset thereof) is assigned as an independent variable used for the purpose of determining hotspot information. The reasoning engine determines hotspot information by comparing real-time fishing data points to those of the initial (historical) base model. As with the initial base model, the real-time fishing data points could be collected from multiple sources, including, but not limited to, one or more sonar devices and the internet.

For example it may be that fish gather at a particular location and depth in a body of water whenever the surface water temperature rises to more than 75 degrees Fahrenheit. This rise is surface water temperature may be closely correlated with extended periods of high air temperatures. Over time, the reasoning engine would find that the concentration of fish, detected by sonar devices, correlates well with other information that is available. Surface water temperature is gathered from the thermometer of the sonar device, and air temperatures are gathered from an air temperature sensor on the sonar device or weather reports available over the internet. When the sonar device is placed in water, it reports the current temperature to the remote computing system. The remote computing system predicts where the fish will be based on the current water temperature. According to one embodiment of the present invention, the reasoning engine also determines where the fish are expected to be without even requiring data from the sonar device. The remote computing system gathers weather data over the internet and uses it to predict the location of fish, based on sonar data gathered in the past, without requiring current data gathered directly by the sonar device. The reasoning engine may use first order correlations, second order correlations, or any correlations that tend to accurately predict the location of fish.

According to an embodiment of the present invention, the remote computing system gathers data from the fishermen themselves, such as fish caught, size of fish, species, bait used, etc. This data can also be assigned independent variables and correlated with other fishing data points allowing the reasoning engine to predict, not only where the fish will be, but also the chance of success in catching them and the ideal choice of bait to use. Through the means described above, fishing hotspots can be determined through empirical data rather than sneaking and spying on other fishermen.

According to an embodiment of the present invention, once the hotspot information is determined, the remote computing transmits hotspot information to one or more wireless computing devices, thereby allowing fishermen to locate, in real-time, the best place to fish. The more information the remote computing system is provided on a location, the more confidently the remote computing system can identify locations were other fishermen have had the most successful fishing or sensors have identified the most number of fish, fish of a certain size or other criteria associated with a hotspot.

According to an embodiment of the present invention, the remote computing system assists in the recovery of a lost sonar device. In a preferred embodiment, the remote computing system receives a notification from a fisherman that a sonar device has been lost. The remote computing system then sends a notice to other fishermen that are connected to or otherwise utilizing the remote computing system that informs those fishermen of the lost sonar device. If and when the sonar device is found, it may be returned to the proper owner based on a unique identification number of the sonar device that is recorded when the sonar device is initially registered with the remote computing system.

Figure 4:
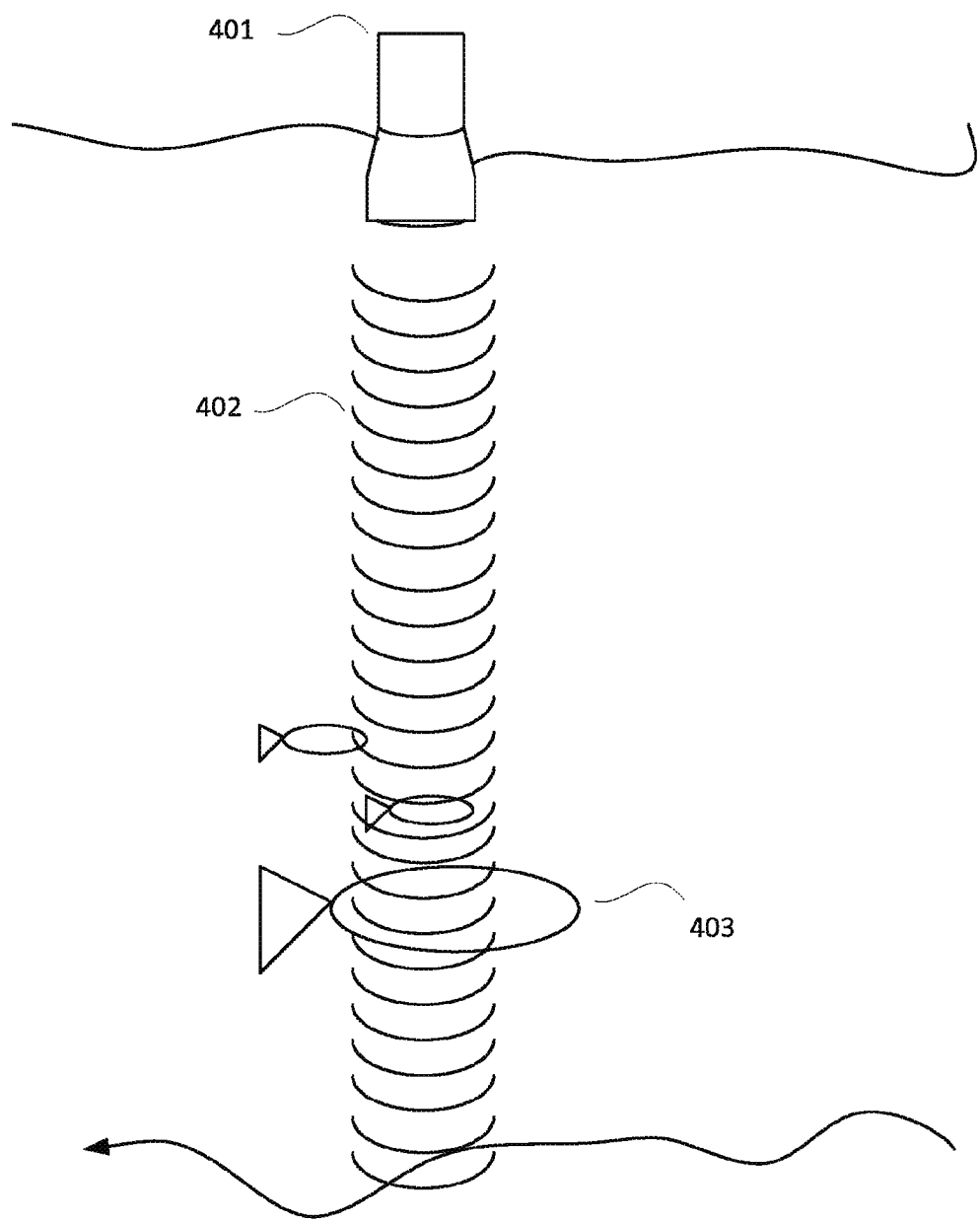
FIG. 4 is an illustration of the general function of the sonar device according to an embodiment of the present invention.

Referring to FIG. 4, an illustration of the general operating concept of the sonar device of the present invention is shown. The sonar device 401 produces sonar signals 402 and a sensor receives reflected sonar waves, or echoes, to detect objects in the water, such as fish 403. The sensor may be incorporated into the sonar device with the emitter or transducer, or the transducer and sensor may be separated from each other. One of ordinary skill in the art would appreciate that there are numerous sonar emitters and sonar sensors in a variety of configurations that could be utilized without departing from the spirit and scope of the present invention and embodiments of the present invention are contemplated for use with any sonar or reflected energy system.

Figure 5A:
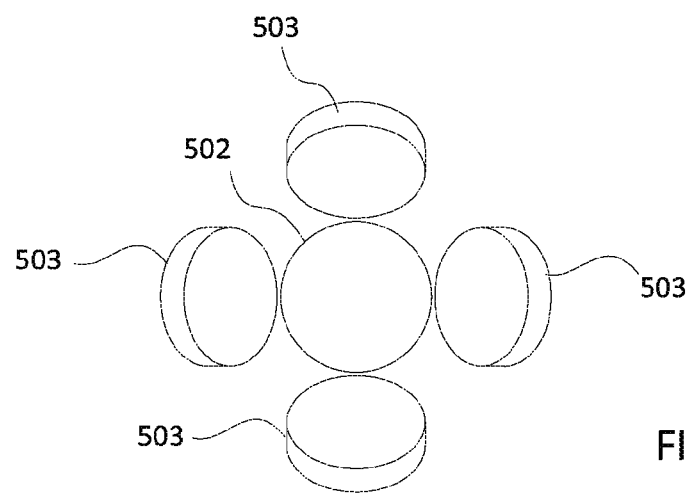
FIG. 5A is an illustration of the top view of a conceptual diagram of a sonar device with four side sonar transducers according to an embodiment on the present invention.
Figure 5B:
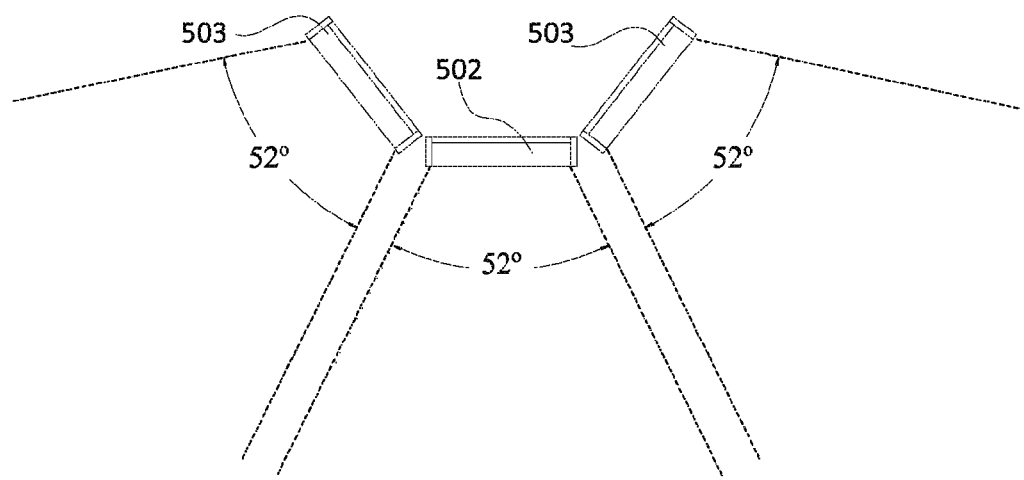
FIG. 5B is an illustration of the side view of a conceptual diagram of a sonar device with four side sonar transducers according to an embodiment on the present invention.

According to an embodiment of the present invention, a multiple transducer arrangement is illustrated in FIG. 5A and FIG. 5B. The downward facing transducer 502 is surrounded by four side transducers 503 as shown in FIG. 5A. FIG. 5B shows the angle of the side transducers 503 relative to the downward facing transducer 502. The side transducers 503 allow the sonar device 501 to scan the water in a wider area around the sonar device 501. According to one embodiment of the present invention, the beam width of the transducers is 52 degrees and the side transducers 503 are arranged at a 52 degree angle relative to the downward facing transducer 502. This arrangement minimizes overlap between the transducer beams. It is also possible to overlap the transducer beams by reducing the angle between transducers to less than 52 degrees. In this case, processing must be done to account for the overlapping sonar data so that a fish in the overlapping zone is not interpreted as two individual fish.

Figure 5C:
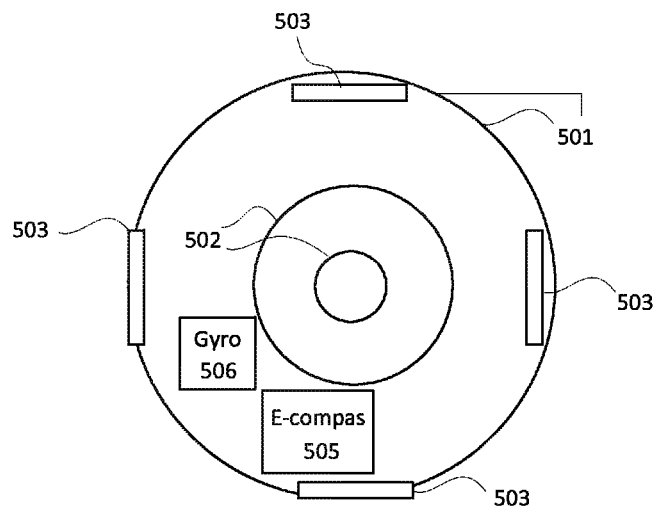
FIG. 5C is an illustration of the top view the sonar device with side sonar transducers according to an embodiment on the present invention.
Figure 5D:
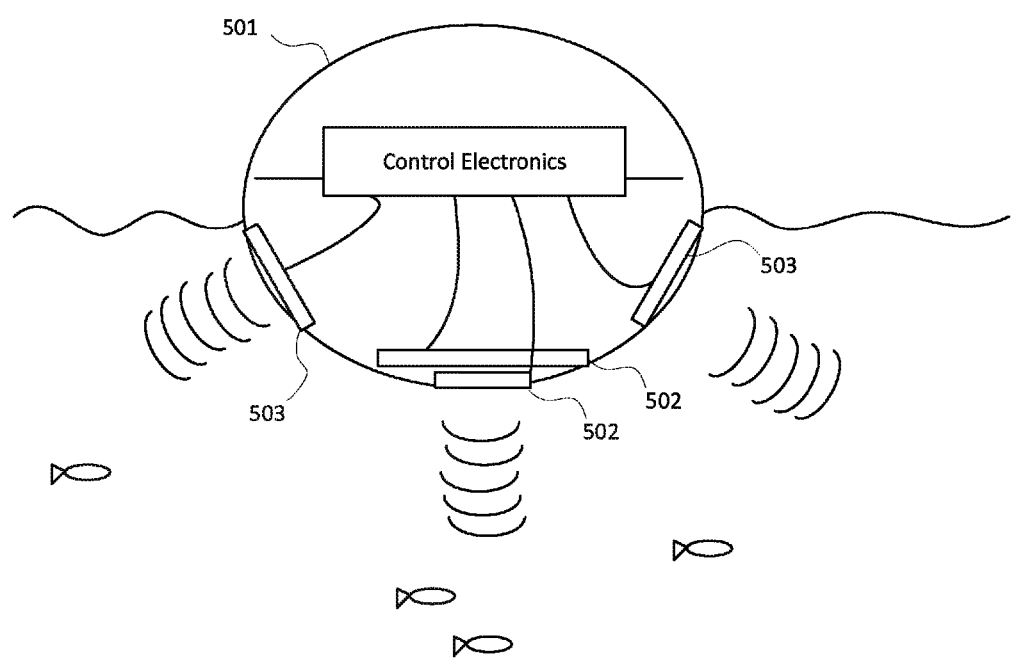
FIG. 5D is an illustration of the side view the sonar device with side sonar transducers according to an embodiment on the present invention. 52°

According to an embodiment of the present invention illustrated in FIG. 5C and FIG. 5D, the multiple transducer design of FIG. 5A and FIG. 5B is incorporated into the sonar device. According to an embodiment of the present invention, the sonar device 501 comprises two downward facing transducers 502 and one or more side transducers 503. The downward facing transducers 502 are arranged concentrically and allow for two different beam widths and/or two different ping frequencies to be used. The side transducers may be arranged at an angle relative to the downward facing transducers between 10 degrees and 90 degrees.

In order to use multiple sonar transducers on a single sonar device, some mechanism must be used to avoid interference between the multiple transducers. The simplest way to do this would be to only use one transducer at a time in sequence. The sonar device pings with one transducer, receives the echo, then moves to the next transducer and repeats until data from all transducers has been received. The sonar device may also avoid interference by pinging simultaneously with two side transducers that are opposite each other. Because the echoes are coming from opposite sides of the device, there is no interference. This cuts the time it takes to cycle through the side transducers in half.

In another embodiment of the present invention, the sonar device avoids interference by using a different frequency on each transducer. The transducers and receivers are sensitive to only a limited range of frequencies to avoid cross-talk. In yet another embodiment, the sonar device avoids interference by assigning a unique signature ping pattern to each transducer. The unique ping pattern is produced by emitting a series of pings of varying length and/or time spacing between them. The ping pattern may also vary in frequency. In order to receive the echo data for a particular transducer, the sonar device looks for the specific signature ping pattern and only uses data that fits that signature ping pattern, discarding everything else. In another embodiment, the sonar device may receive all the echoes from all transducers through a single broadband receiver and process the data later to extract the information for each individual transducer. One or ordinary skill in the art would recognize that any of these methods or a combination of them can be used to distinguish the echoes corresponding to each transducer from each other without departing from the spirit and scope of the present invention.

When side transducers are used, it becomes necessary to distinguish which side of the sonar device a fish is found on. For example, if a fish is on the left of the sonar device, that information is ambiguous unless it is clear which side of the sonar device is defined as the left side. Referring to FIG. 5C, the sonar device 501 also includes an electronic compass 505 and/or a gyroscopic sensor 506. The electronic compass 505 allows the sonar device 501 to define transducers by their absolute orientations related to North, South, East, and West. The wireless computing device can then coordinate its display of found fish so that fish found to the north are actually reported on the screen as being to the north. As the sonar device 501 rotates in the water, the compass reports the change in orientation so the sonar device 501 can accurately report the absolute location of found fish.

According to an embodiment of the present invention, the compass is implemented as a three-axis magnetometer and used in combination with a three-axis accelerometer. The processor uses the accelerometer data in combination with the magnetometer data to compensate for error introduced by tilting and rotation of the sonar device.

There are a variety of ways for determining a reference orientation of the sonar device so that data of fish found can be properly interpreted. If there is an electronic compass in the wireless computing device, it can be calibrated and synced with the electronic compass in the sonar device. Calibration and syncing can be done by orienting both devices in a reference direction so that any difference in what each compass interprets as north can be accounted for and corrected. Another method is to use a visual indicator on the sonar device, such as an LED, arrow, or color scheme on the housing. A corresponding visual indicator is then also displayed on the screen of the wireless computing device to indicate to the user a reference direction for interpreting results of fish found.

The gyroscopic sensor 506 senses forces in the directions of pitch, roll, and/or yaw of the sonar device 501. As the sonar device bobs and rolls on the surface of the water, the angle of the sonar beam relative to the bottom of the body of water changes. Fish may be detected 50 feet from the sensor, but if the sensor is pointed at an angle, the fish may actually be 30 feet to one side at a depth of 40 feet. This becomes even more important when side transducers are used because the side transducers are much more sensitive to shifts in angle than the bottom transducer. For example, a change in pitch of 2 degrees might produce an error of several inches in the location of the fish found directly below the sonar device, but the same change in pitch would produce an error of several feet for the fish found by the side transducers. By taking measurements of the changes in pitch and roll from the gyroscopic sensor 506, the sonar device 501 can compensate and correct for these errors and produce accurate results of how deep fish are found as well as their horizontal distance from the sonar device.

According to an embodiment of the present invention, The systems and methods described herein are configured to allow for the creation, transmission, processing, analysis and display of digital signals where limitations in processing power and/or memory capacity preclude storing and/or processing the entire data sample at once. In general, the data sample or signal is caused to be reproduced multiple times and only a portion of the return signal is processed each time. Combining the results from each iteration produces a complete result.

In a preferred embodiment of the present invention, the systems and methods described herein may be used to assist in the processing of sonar pulses, such as those used in fish finding and other water column analysis applications. According to an embodiment of the present invention, the system is configured to generate numerous iterations of a signal (e.g., sonar) and process only a portion of each return. The portion (or subset) of the returned signal that is processed is set based on the parameters of the system. For instance, a low-power processor may not be able to process the entire return signal at a time. Therefore, the system is configured to select a portion of each return signal with each portion (or subset) set to a size that the low-power processor is capable of processing. Similarly, the case may be that the processor is not the limiting factor, but rather the bandwidth (e.g., the bandwidth of a Bluetooth Smart connection may not be great enough to transmit an entire signal set to a processing component of the system). In this case, the system would divide the signal into subsets not only appropriate for transmission based on bandwidth, but also in such a manner as to allow for the subsets to represent a full image of the data set when fully processed by the processing component of the system.

Figure 6:
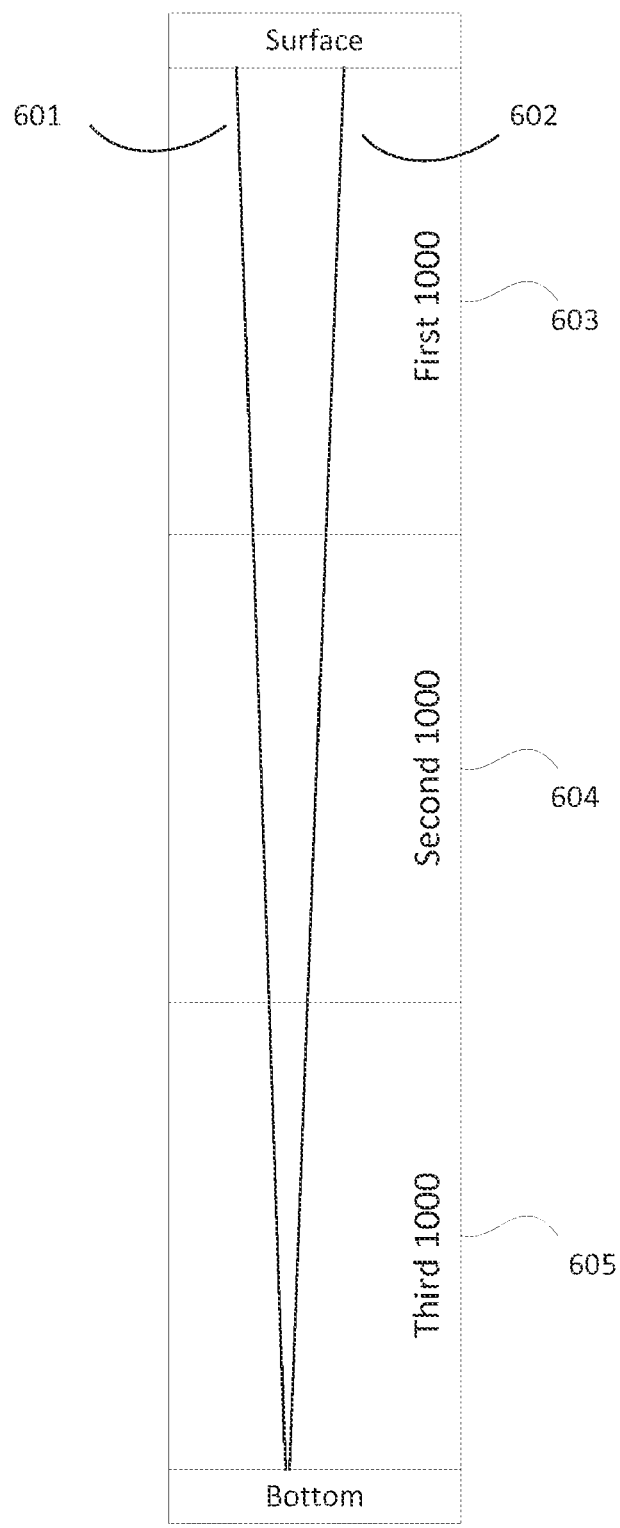
FIG. 6 is a diagram illustrating a method of splitting up a sonar reading into multiple parts recorded across multiple pings according to an embodiment of the present invention.

An example of this method of breaking up a sonar return signal into manageable portions is illustrated in FIG. 6. A sonar system may be utilized where the memory required to process the entire sonar return signal would have to be able to store 3000 samples and the system only has memory enough for 1000 samples. In order to allow the system to process the sonar return given the limited memory, the system sends out the sonar ping 601 three times and records the first 1000 samples 603 from the first echo 602, the second 1000 samples 604 on the second echo 602, and the third 1000 samples 605 from the third echo 602. The system would then have time between sending out the pulses to process those 1000 samples. The system can further be configured to send sonar pulses out as fast as possible so that the returns from each pulse are as similar as possible and to account for any variation in processing speed (e.g., cycles/bandwidth/memory taken by other components of the system). In certain embodiments, the shortest time interval between sonar pulses is limited by the maximum range of the sonar system since receipt of an echo from a previous pulse could occur after the system sent the next pulse.

In another embodiment of the present invention, the shortest time interval between pulses may be shorter than the maximum range of the sonar system. If the bottom of a body of water is closer than the maximum range of the sonar system, the system need not store reflection data after data corresponding to the bottom has already been recorded. If the bottom of the body of water is close enough that the entire return signal can fit in available memory, then the echo does not need to be broken into parts, though it may still be broken into parts for transmission in order to satisfy bandwidth constraints.

Figure 7:
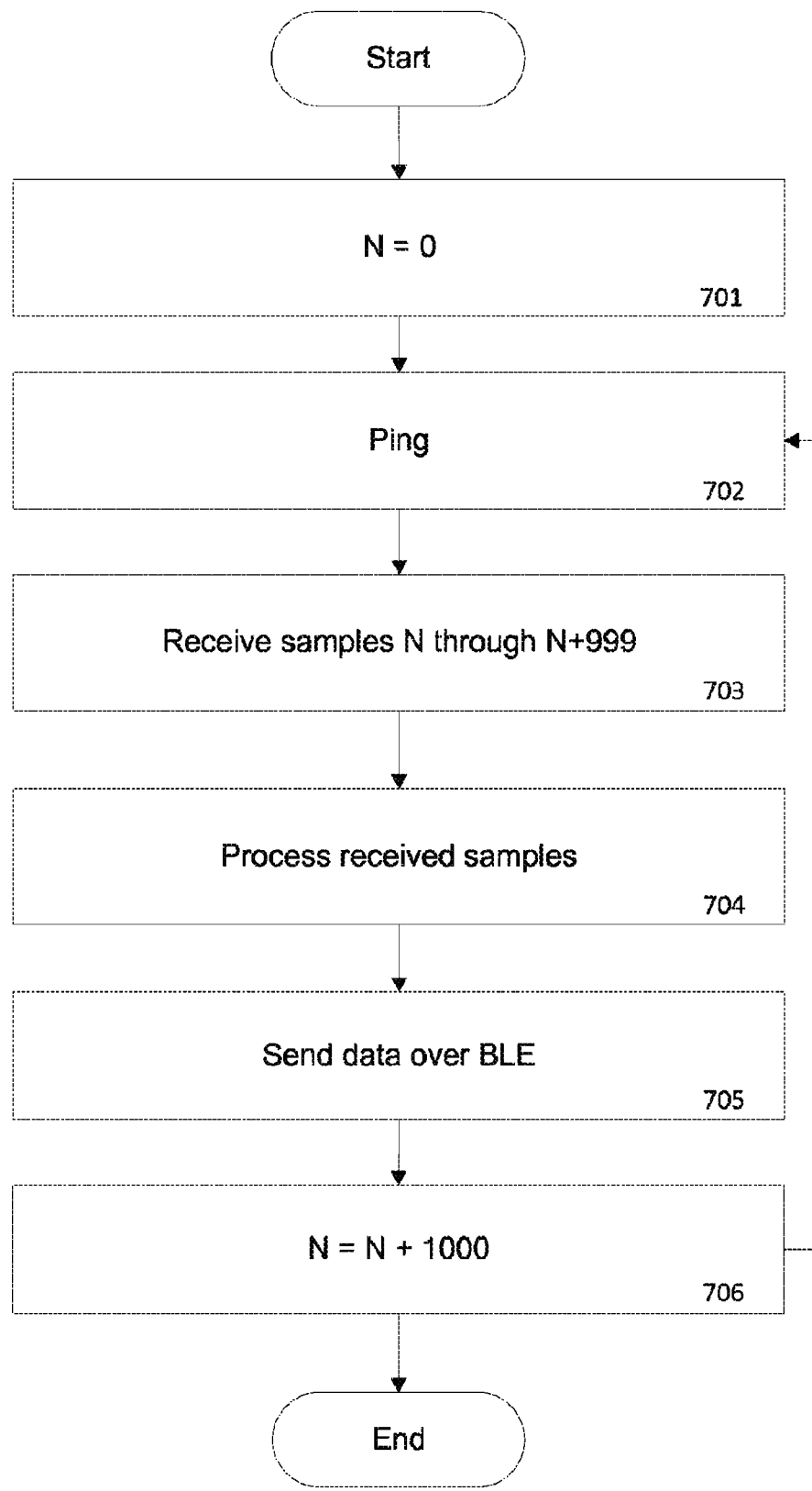
FIG. 7 is a flowchart of a method of splitting up a sonar reading into multiple parts recorded across multiple pings according to an embodiment of the present invention.

The method used for breaking up a data set into manageable portions is illustrated in the flowchart of FIG. 7. The method starts by setting the variable N equal to zero in step 701. N represents the index number of the samples to be recorded on a given ping. On the first ping, the first 1000 samples are recorded, so N starts at zero and ends at 999. At step 702, the system generates a ping. At step 703, the samples are recorded starting at sample N and continuing for 1000 samples, or N plus 999. The set of recorded samples are processed in step 704, and the data is sent over the BLE connection in step 705. The variable N is then incremented to the record the next portion of samples in step 706 and the system returns to step 702 to generate the next ping.

It is important to note that the system would not have to use the first 1000 samples for first pulse, 2nd 1000 samples for second pulse, etc. The system can be configured to use any order. For example, on the first pulse, the first 1000 samples could be recorded. While the first 1000 samples are being processed and transmitted, the middle samples would be ignored. Then, by the time the last 1000 samples arrive, the processing and transmission of the first 1000 samples is complete and the system then records the last 1000 samples which were a reflection of the first pulse. Preferred embodiments of the present invention can speed up the whole process by rearranging the order depending on certain variables, known information and other characteristics. In other words, the system might want to start sending the second pulse before it finishes processing the data recorded from the first pulse so that the return data the system is interested in from the second pulse shows up just as we finished processing the first chunk of data.

According to an embodiment of the present invention, the chunks of data can also overlap. Sampling 1000 samples starting at time 0 and sampling the second 1000 samples starting at sample time 750 would result in a 250 sample overlap between the two. In the flowchart example of FIG. 7, 1000 samples would be recorded in step 703, but N would only be incremented by 750 in step 706. Handling a return in this manner (a return that straddles two buffers) would have to be done where other characteristics point to the usefulness of such an overlap. For instance, improper use of overlapping in a sonar return utilized in a fish finder application could make a small fish look big, a big fish look small, or maybe even cause a fish to disappear. Certain embodiments of the present invention may allow the system to overlap the sample windows that are used on different pings so that the echoes from a target that cross between windows do not get distorted. Still other embodiments of the present invention may utilize a smoothing filter or other algorithm to provide seamless transitions between data sets.

According to one embodiment of the present invention, the system uses known information to allow the system to identify useful and non-useful portions of a return signal in a sonar application. One example of this is bottom profiling. When in bottom profiling mode of operation, the system can assume the bottom of a water column should be within a certain distance of the last previously known bottom location. In this manner, the system can determine only to process data received before the reflection we know is the bottom. For example, only look for the bottom within +/−5 meters of where we last saw it and ignore all data after it. This would allow the system to take samples more frequently than if we processed the entire return. Even in the case of a cliff or other drop-off, the system would only have to find the bottom with a full scan on one additional sample set, then return to processing only that portion within the error margin (e.g., +/−5 meters).

While portions of this disclosure focus on sonar processing, embodiments of the present invention could be utilized and applied to any digital signal processing task where a system using components with limited computational resources needs to reproduce a signal multiple times so that it only has to process a limited piece of it at one time. For instance, the systems and methods described herein could be used in conjunction with imaging systems (e.g., IR systems, optical camera systems), audio detection systems, motion detection systems or any other digital signal processing system. One of ordinary skill in the art would appreciate that there are numerous types of digital signals that could be utilized with embodiments of the present invention, and embodiments of the present invention are contemplated for use with any digital signal.

Figure 8:
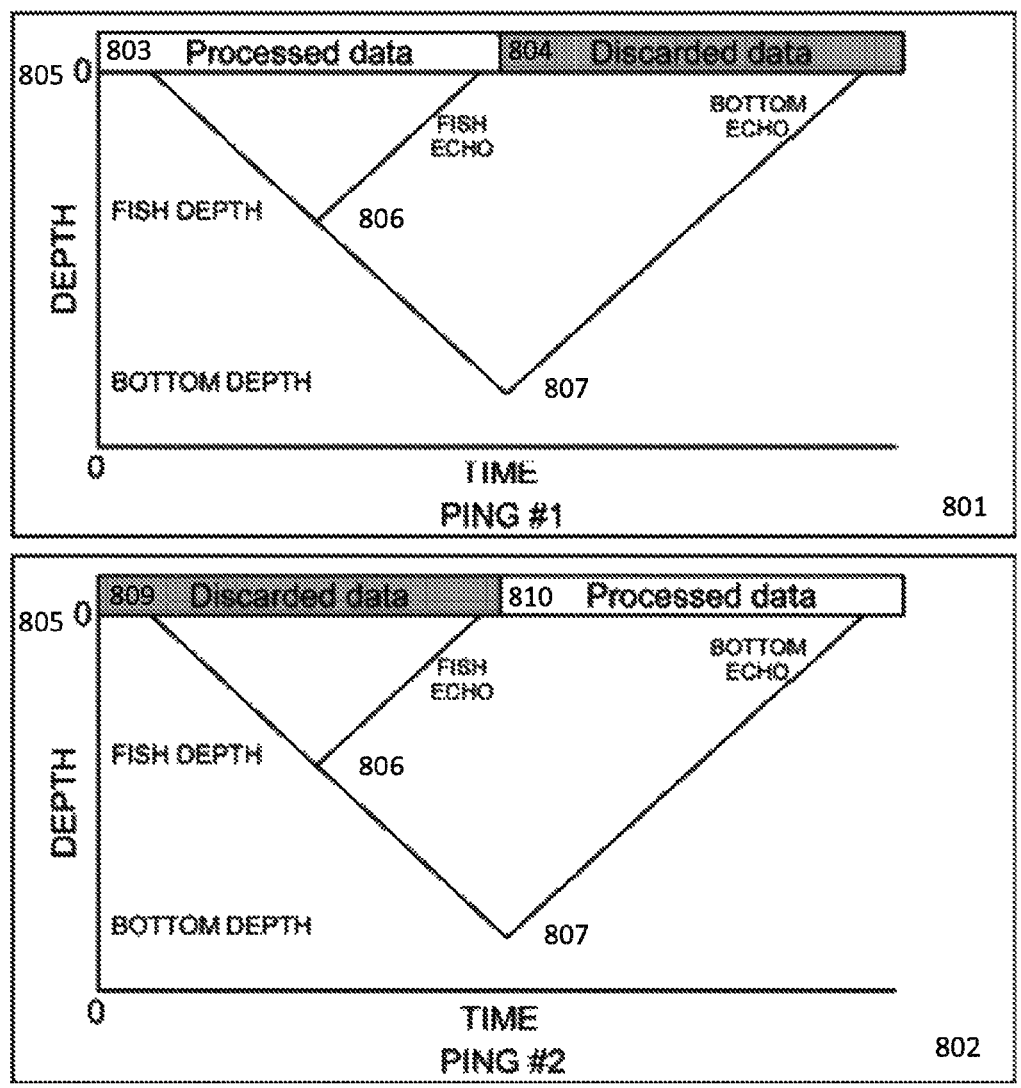
FIG. 8 is a diagram illustrating a method of splitting up a sonar reading into multiple parts by processing a subset of data and discarding the rest of the data across multiple pings according to an embodiment of the present invention.

Turning now to FIG. 8, the relationship between processed data and discarded data is shown in relation to signals transmitted by a sonar device on two separate pings. Objects that are nearer to the surface of the water will reflect an echo that will return to the sonar sensor sooner than objects that are deeper in the water and thus further from the sonar transducer and receiver. Therefore, earlier time samples of the reflection will contain information about objects found nearer to the surface, where the sonar device floats. In other words, the time at which reflections or echoes are received is directly proportional to the depth of the object that reflected them. Therefore, referring to FIG. 8, the processed data 803 from PING #1 801 corresponds to the area of water between the surface 805 and the halfway point 806. The discarded data 804 is the data between the halfway point 806 and the bottom 807. On PING #2 802, the data that was processed from PING #1 801 becomes discarded data 809, and the remainder of the data is processed data 810. In this manner, the full depth of the water below the sonar device can be processed even when processing power, and/or memory storage is insufficient to handle the entire data set from a single ping at once.

According to an embodiment of the present invention, sonar is used to detect the presence of fish in the water. However, the data management, interpretation, and processing methods are similar for many object detection methods that use reflected energy. Therefore, in addition to, or instead of sonar, the system described herein could use Light Detection And Ranging (LIDAR), laser, infrared, or any electromagnetic or other energy reflection detection sensor. One of ordinary skill in the art would recognize that a variety of different reflected energy technologies could be used without departing from the spirit and scope of the present invention.

According to an embodiment of the present invention, the sonar device includes an accelerometer. In one embodiment, the accelerometer is configured to activate the sonar device when the accelerometer detects that the sonar device has been cast out on the line of a fishing rod. In yet another embodiment, the accelerometer is configured to alert the fisherman that there is a fish at the end of the line through detection of sudden or rapid movements such as those generated when a fish tugs or otherwise pulls on a fishing line attached to a housing containing or integrated with the accelerometer. The accelerometer may also be used in conjunction with the compass an gyroscopic sensor to generate a full profile of motion and orientation of the sonar device to be used for correcting data to accurately show where fish are found even in choppy waters, or while the sonar device is moving across the surface of the water, such as when being reeled in or pulled behind a boat.

According to an embodiment of the present invention, the sonar device includes a thermometer. In a preferred embodiment, a thermometer may sense the temperature of water and/or the air. One of ordinary skill in the art would appreciate that there are numerous thermometers that could be utilized with embodiments of the present invention and embodiments of the present invention are contemplated for use with any thermometer.

According to an embodiment of the present invention, the sonar device includes a speed sensor. In a preferred embodiment, the speed sensor is a propeller attached to the housing that could measure the speed of the water when the sonar device is tethered or pulled by the fisherman. One of the ordinary skill in the art would appreciate that there are numerous speed sensors that could be utilized with embodiments of the present invention and embodiments of the present invention are contemplated for use with any speed sensor.

According to an embodiment of the present invention, the sonar device includes a conductivity sensor. In a preferred embodiment, the conductivity sensor would sense the salinity of the water in which the sonar device is floating. With the salinity of the water known, the input and/or output of the sonar sensor could be adjusted appropriately to account for the differing speeds of a sonar wave in fresh versus salt water. One of ordinary skill in the art would appreciate that there are numerous forms and functions that conductivity sensor might take on and embodiments of the present invention are contemplated for use with any of those forms and functions.

According to an embodiment of the present invention, the wireless computing device includes a means of wireless communication. The wireless communication means allows the wireless computing device to have bidirectional communication with the sonar device. In a preferred embodiment, the wireless communications means may be Bluetooth Smart (BLE). One of ordinary skill in the art would appreciate that there are numerous wireless communication means that could be utilized with embodiments of the present invention and embodiments of the present invention are contemplated for use with any wireless communication means.

According to an embodiment of the present invention, the communication means of the wireless computing device might include access to one or more local area networks (LAN) or wide area networks (WAN) (e.g., the Internet). Access to remote networks, such as the Internet, could allow the wireless computing device to upload information collected from the sonar device to the remote computing system where it could be processed for use by other fisherman and/or stored for other uses.

According to an embodiment of the present invention, the wireless computing device includes a viewing screen. The viewing screen allows the wireless computing device to display the information collected by the sonar device to the fisherman.

According to an embodiment of the present invention, the wireless computing device does not include a viewing screen. In a preferred embodiment, such a wireless computing device could be an additional sonar device or series of sonar devices that are communicatively linked together. The sonar devices would then collectively communicate with another wireless computing device with a viewing screen (e.g., smartphone) to generate a larger sample of information than would one sonar device on its own.

According to an embodiment of the present invention, the wireless computing device might include a global position system ("GPS"). In a preferred embodiment, the GPS could allow a fisherman to locate fishing hotspots or record locations identified by the sonar device as potential fishing hotspots. According to an embodiment of the present invention, the sonar device also includes a Global Positioning System (GPS). The sonar device GPS can be used to more accurately report the GPS location of fish found when the sonar device is separated from the wireless computing device by some distance. In ideal circumstances, the GPS of the wireless computing device provides accurate location data for fish found. However, the accuracy the location reported by the wireless computing device decreases as the distance between the wireless computing device and the sonar device increases.

According to an embodiment of the present invention, the wireless computing device might include a camera. In a preferred embodiment, the camera could be used to allow a fisherman to photograph the fish and/or the fishing location. One of ordinary skill in the art would appreciate that there are numerous forms and functions that the camera might take on and embodiments of the present invention are contemplated for use with any of those forms and functions.

According to an embodiment of the present invention, the system herein described is configured to allow a fisherman to more easily locate and catch fish. In a preferred embodiment of the present invention, the sonar device is wirelessly paired with the wireless computing device. The fisherman could then secure a fishing line to the sonar device and cast into the water. The sonar device, sensing that it was cast (e.g., through the use of an onboard accelerometer, through rapid change in the signal strength between the communications means of the sonar device and the communication means of the wireless computing device), could then begin to collect information, including, but not limited to, the presence of fish, bottom depth, water temperature, and air temperature. The information would then be communicated to the wireless computing device via a Bluetooth Smart connection.

According to an embodiment of the present invention, the sonar device is configured to enter a low energy mode until sensor activity is detected. In a preferred embodiment the fisherman would be able to set the threshold level that is required before the sonar device becomes fully active for one or more of the one or more sensors present on the sonar device. When sensor activity reaches or exceeds the determined threshold level, the sonar device exits lower energy mode and would begin to communicate information to the wireless computing device.

According to an embodiment of the present invention, the sonar device may be used for synthetic aperture sonar imaging. In a preferred embodiment, the sonar device could be pulled in some fashion including, but not limited to, by hand, by fishing reel, or by boat, over an area of water to collect data over that area. The collected data could then be analyzed to create a continuous sonar image of the area over which the sonar device was pulled.

According to an embodiment of the present invention, the embodiment that includes synthetic aperture sonar imaging requires that the sonar device be pulled at a knowable speed. In one embodiment of the present invention, the speed at which the sonar device is being pulled may be calculated based upon the rate at which the sonar device is being reeled in. In this embodiment, the reeling rate may be determined in a number of ways, including, but not limited to, a speedometer on the reel or calculation based upon the cranking ratio of the reel. In another one embodiment the speed of the sonar device may be measured by a flow sensor on the sonar device. One of ordinary skill in the art would appreciate that there are numerous means by which the speed of the sonar device could be calculated and embodiments of the present invention are contemplated for use with any of those means.

Exemplary Embodiments

Figure 9:
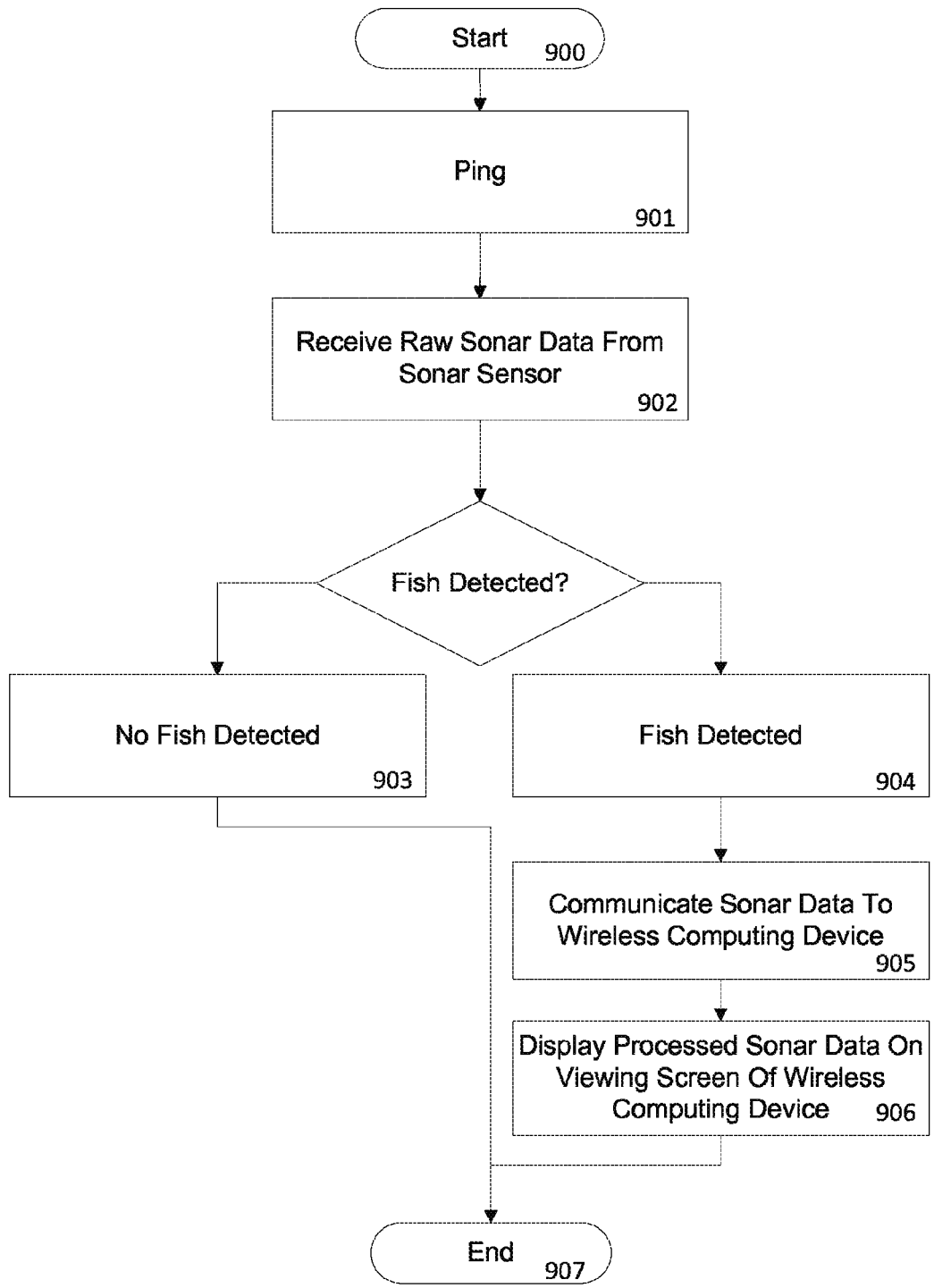
FIG. 9 is a flowchart showing the method of using the sonar fish finding system according to an embodiment of the present invention.
Figure 11:
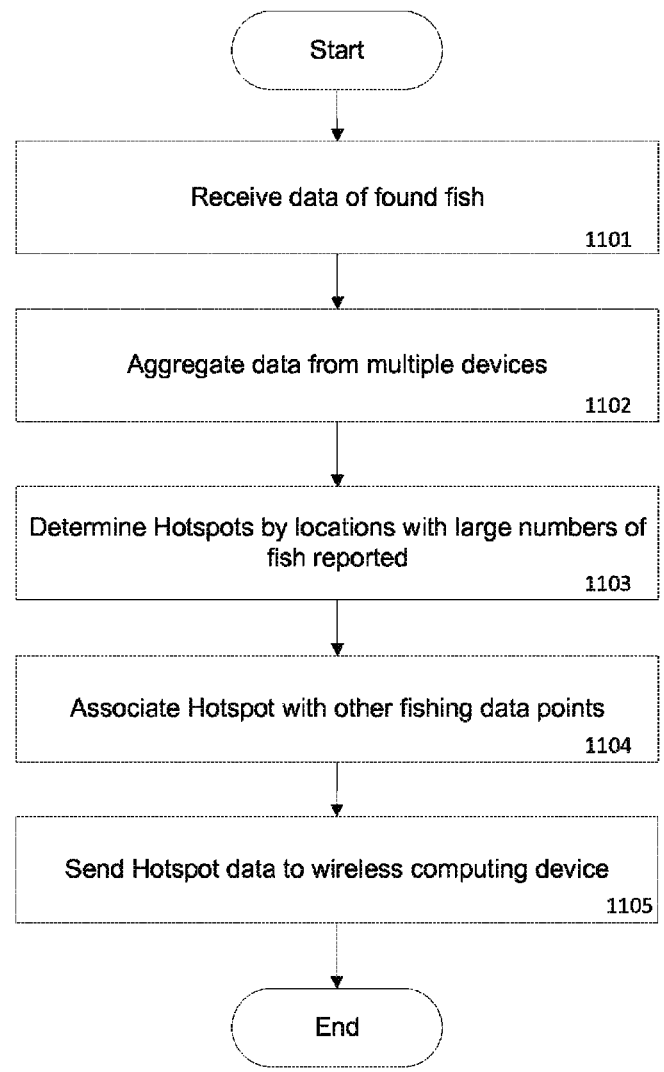
FIG. 11 is a flowchart illustrating the process of determining hotspots from current sonar data according to an embodiment of the present invention.

The following is an exemplary embodiment of a method of finding fish using a sonar device and a wireless computing device, as show in FIG. 9. At step 900, the sonar device is prepared for deployment by securing a fishing line to the sonar device. The sonar device can be placed into the water via casting with a fishing rod or deployed by hand.

At step 901, the sonar device sends one or more sonar pings into the water.

At step 902, the raw sonar data is received from the sonar sensor by the processor on board the sonar device. The raw sonar data may be received by the processor, for instance, as a stream of data or in batches. One of ordinary skill in the art would appreciate that there are numerous ways in which the raw sonar data may be received by the processor, and embodiments of the present invention are contemplated for use with any form of receiving raw sonar data at the processor.

At step 903, the sonar device does not detect any fish and goes into a low energy state until the presence of fish is detected. In this low energy state, no data is sent over the wireless connection, but the sonar transducer continues to operate by sending out sonar pulses until such time as fish are detected by the sonar sensor.

According to an embodiment of the present invention, the sonar device does not fully process sonar data to find fish, but merely looks for signatures that indicate a reflection before the bottom reflection. The location of the bottom can be determined using bottom profiling, explained earlier in this specification. When the sonar device sees an unexpected reflection that is not already known through bottom profiling, it returns to an active state, restores the connection and sends data for further processing.

At step 904, the sonar device detects the presence of fish and, if in low energy mode, returns to the fully functional state. The sonar transducer continues to send sonar pulses and creates raw sonar data from any returns. Exiting the low energy mode may also include activating various other sensors on the sonar device and the processor such that it is actively awaiting the raw sonar data from the sonar sensor.

At step 905, the raw sonar data is transmitted to the wireless computing device. The raw sonar data may also be transmitted directly to the remote computing system.

At step 906, the wireless computing device processes the data and displays a visual representation indicating where fish are found.

At step 907, the process terminates. Alternatively, the process can loop back to step 901 until the sonar device is powered off or is removed from the water.

According to an embodiment of the present invention, the sonar data is sent to the wireless computing device by a Bluetooth Smart (BLE) connection in order to conserve energy. The BLE protocol places certain constraints on data transmissions in order to reduce power consumption. The present invention includes a method for creating and sending data packets that allows for large data sets to be divided into parts, sent over BLE, and reconstructed in their original form on the receiving end. This process is illustrated in the flowcharts of FIG. 10A and FIG. 10B. Referring to the flowchart of FIG. 10A, a ping is sent in step 1001 and the echo data is received in step 1002.

According to one embodiment of the present invention, the echo data is limited to what can be stored in memory onboard the sonar device in step 1003. Memory limitations may or may not require that the echo data be received over multiple pings as described in relation to FIGS. 6-8. Echo data is divided and sent 18 bytes at a time, and the first 18 bytes is taken in step 1004.

In step 1005, A 2-byte header index is then added to the 18-byte chunk of data to produce one 20-byte data packet. The 2-byte header index is an array index that indicates the 18-byte chunks position in the overall set of data. The 2-byte header assumes an array of 16-bit words, so if the first 18-byte chunk is assigned a 2-byte header index value of 0, the next 18-byte chunk of data will have a 2-byte header index value of 9.

The 20-byte BLE data packet is then sent over BLE in step 1006. 20 bytes is the maximum allowable data packet size in certain implementations of the BLE communication protocol.

After sending a data packet, the sonar device gets the next 18 bytes of data in step 1007 and returns to step 1005 to assign a 2-byte header index. This process is repeated until the entire set of sonar data for a single ping is sent over BLE. When the end of the data is reached, the last 20-byte data packet is given a 2-byte header index value of 0xFFFF, or 65535.

FIG. 10B shows a flowchart for how the echo data generated by a ping is received and reconstructed to produce the entire set of sonar data for a single ping. At step 1008, all of the 20-byte data packets of data are received. Alternatively, the data packets could be received one by one and the ping data could be reconstructed as the data is received. One of ordinary skill in the art would recognize that the steps could be reorganized without departing from the spirit and scope of the present invention.

At step 1009, the echo data is reconstructed using the array index indicated by the 2-byte header index. This can be done by storing each 18-byte chunk of data in memory using a memory offset indicated by the 2-byte header index. Alternatively, reconstruction may be done using array arithmetic. One or ordinary skill in the art would recognize that there are a variety of ways to use the 2-byte header index to reconstruct the data set without departing from the spirit and scope of the present invention.

In step 1010, the bottom is found in the data set. The bottom is the largest peak in the echo data, so it is easy to find.

In step 1011, fish are found at some point before the bottom. Since the bottom is the last echo to arrive, any information received after the bottom can be ignored when looking for fish which live somewhere above the bottom of the body of water. The results of processing the data to find fish are then displayed to the user in step 1012.

The details of Bluetooth and particularly the Bluetooth Smart protocol are readily available, but relevant details will be discussed here for convenience.

Bluetooth uses a radio technology called frequency-hopping spread spectrum. Wireless communication protocols commonly divide the wireless spectrum into channels and send data in packets. In Bluetooth, the transmitted data is divided into packets and each packet is transmitted on one of the 79 designated Bluetooth channels. Each channel has a bandwidth of 1 MHz. Bluetooth 4.0, which defines the Bluetooth Smart standard, uses 2 MHz spacing which allows for 40 channels. The first channel starts at 2402 MHz and continues up to 2480 MHz in 1 MHz steps. It usually performs 1600 hops per second, with Adaptive Frequency-Hopping (AFH) enabled. In the Bluetooth Smart protocol, transmissions are divided into a series of connection events, and connection events occur at the beginning of each connection interval. The number of packets that can be sent in a connection event is limited and a connection interval may be considerably longer than the time it takes to transmit data during a connection event. This allows battery drain to be reduced by reducing the amount of data that is transmitted per connection interval.

According to an embodiment of the present invention, the full set of data for a single ping is stored in 423 16-bit words for a total of 940 bytes sent in 47 20-byte data packets. The power consumption, data transmission rate, and other factors are determined by BLE connection settings. One of these settings is the connection interval which defines the period of time between the beginnings of consecutive connection events. During a connection event, the two devices choose a channel over which to communicate and exchange information. In an ideal situation when communicating with a smartphone or tablet PC, four 20-byte data packets are sent every connection interval. This connection interval can range between the minimum and maximum settings. The BLE standard requires a connection interval between 7.5 milliseconds and 4 seconds. Shorter connection intervals increase transfer rates and energy usage. According to one embodiment of the present invention, the minimum connection interval is 25 ms and the maximum connection interval is 50 ms.

If no data packets are sent during a connection interval, a supervisor timeout timer is initiated. If no communication occurs within the supervisory timeout period, the smartphone or tablet PC will close the connection. Slave latency allows for a number of connection intervals to be skipped by the ReelSonar without triggering the supervisor timeout timer. According to one embodiment of the present invention, the supervisor timeout period is 5.9 seconds and the slave latency is 4, which allows the sonar to go silent for up to 4+1 connection intervals, 125 ms to 250 ms in the present example. The slave latency is important for moments when the Bluetooth radio must be silenced to decrease noise when collecting echo data.

The method illustrated with reference to FIG. 10A and FIG. 10B can be used in combination with the method illustrated in FIGS. 6-8 in order to receive, record, or collect a full representation of a sonar ping by generating multiple pings, collecting 18 bytes of ping data on each ping, and sending those 18 bytes with a 2-byte index to a wireless computing device for reassembly. One of ordinary skill in the art would recognize that one or both of these methods could be used in order to improve the efficiency and augment the processing capabilities of a low power wireless data collection device.

Figure 12:
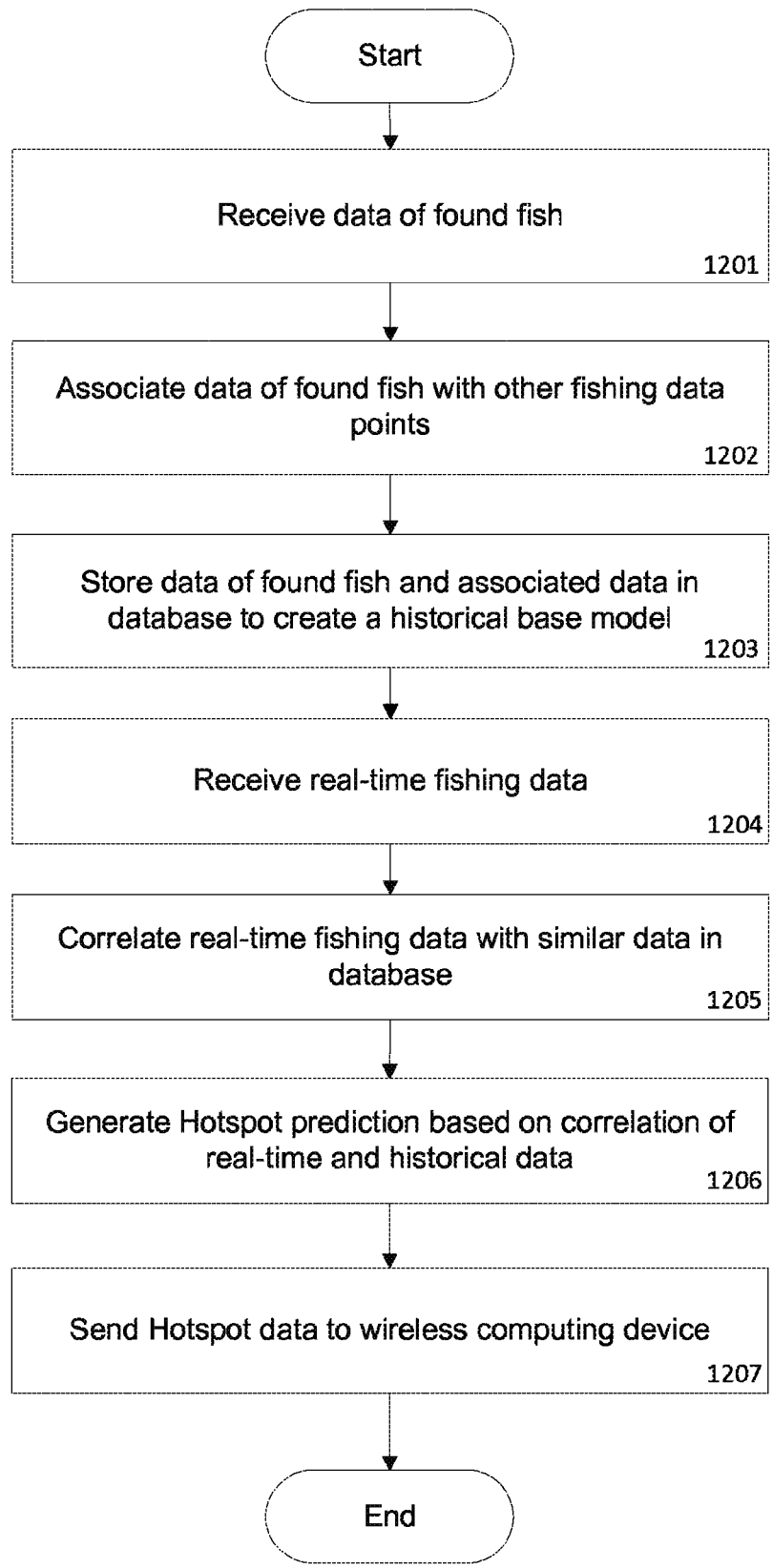
FIG. 12 is a flowchart illustrating the process of determining hotspots from past sonar data, other past environmental data points, and current environmental data points according to an embodiment of the present invention.

The following is an exemplary embodiment of a method for determining hotspot information, as shown in FIG. 12.

At step 1101, the remote computing system receives sonar data collected by one or more sonar devices. The sonar data may be processed to find fish or it may be received as raw sonar data. Sonar data me be received directly from the sonar devices or it could be relayed through one or more wireless computing devices.

At step 1102, the remote computing system aggregates data from multiple sonar devices. This allows the remote computing system to get multiple data sets of fish found for a given region or location on a body of water.

At step 1103, the remote computing system determines hotspot information based upon the aggregated data collected by one or more sonar devices. The hotspot information is based on which locations have more fish than others. The meaning or "more" could mean historically more, more than other nearby spots, more than other bodies of water, or a top percentile of all data collected. Each case may be more or less useful depending on the circumstances. For example, a fisherman who is deciding where to go fishing within a 50 mile radius, might be most concerned with what bodies of water in that geographic region have more fish than other bodies of water within the region. In another situation, a fisherman who is already at a body of water might want to know which spot on that particular body of water has the most fish. In each situation, the data of fish found gathered from sonar devices is interpreted and presented differently.

At step 1104, the remote computing system associates hotspot information with other fishing data points. Fishing data points include, but are not limited to fish activity, water temperature, water depth, water salinity, air temperature, rainfall, weather conditions, seasonal information, location, lunar phase, restocking schedule from a hatchery, movement patterns of typical fish prey such as insects, etc. The hotspot data and associated fishing data points can be stored as a historical record in the database of the remote computing system.

At step 1105, hotspot data is sent to one or more wireless computing devices. This process allows fishermen to get the benefit of information gathered by multiple sonar devices and share information in real-time.

The following is an exemplary embodiment of a method for determining predicted hotspot information, as shown in FIG. 13. At step 1301, the process initiates with the remote computing system receiving data of fish found. The remote computing system may alternatively receive unprocessed data directly from sonar devices or from wireless computing devices.

At step 1302, the reasoning engine associates data of fish found with one or more additional fishing data points. These data points are factors that may influence the location and behavior of fish, such as weather, food availability, or other environmental factors. Fishing data points include, but are not limited to fish activity, water temperature, water depth, water salinity, air temperature, rainfall, weather conditions, seasonal information, location, lunar phase, restocking schedule from a hatchery, movement patterns of typical fish prey such as insects, etc.

At step 1303, the reasoning engine stores data of fish found and associated fishing data points in the database to create a historical base model The base model represents historical trends and correlations between the location of fish and other fishing data points such as weather, food availability, and other environmental factors.

At step 1304, the remote computing system receives real-time fishing data points. This data may come from sensors on one or more sonar devices or from third party data providers.

At step 1305, the reasoning engine correlates real-time fishing data with similar data in the historical base model created from data stored in the database. Data of current conditions is matched with similar conditions in the database in order to infer where fish might be gathered even without having sonar data of the exact location of fish.

At step 1306, the reasoning engine determines hotspot information by matching real-time data to similar data in the historical base model. The locations with the most fish found and that also match the current fishing data points are fishing hotspots.

At step 1307, the remote computing system sends hotspot information to one or more wireless computing devices.

The systems and methods described herein may be enabled through use of one or more computing devices comprising one or more of a processor (e.g., CPU), a non-transitory memory (e.g., RAM), and an electronic storage medium (e.g., Storage Medium) and utilizing one or more computer programs contained therein. Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a remote computing device, remote computing system or other computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein. In the alternative, the computer or a component thereof may be a hardware logic block, such as a field programmable gate array (FPGA).

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a wireless computing device, remote computing system or other computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A fish detection system comprising:
a sonar fishing float, said sonar fishing float comprising:
a first bottom-facing sonar transducer,
a second bottom-facing transducer arranged concentrically with said first bottom-facing transducer, wherein said second bottom-facing transducer generates a ping that is a different frequency and beam width than said first bottom facing transducer,
a sonar sensor,
a processor,
a wireless communication means, and
a housing,
wherein said housing is configured to contain said first bottom sonar transducer, said sonar sensor, said processor, and said wireless communications means,
wherein said first bottom sonar transducer is configured to direct sonar signals directly below said sonar fishing float, and
wherein said wireless communication means is configured to transmit sonar data received from said sonar sensor.

2. The fish detection system of claim 1 further comprising:
one or more side sonar transducers, and
an electronic compass,
wherein said side sonar transducer is configured to direct a sonar signals at an angle relative to said bottom sonar transducer,
wherein said electronic compass is configured to provide cardinal direction data relating to said sonar fishing float,
wherein said processor is configured to process said cardinal direction data with sonar data received from said sonar sensor to produce processed sonar data such that at least part of said processed sonar data is associated with an orientation direction, and
wherein said wireless communication means is configured to transmit said processed data.

3. The fish detection system of claim 2 wherein said orientation direction is a cardinal direction.

4. The fish detection system of claim 1 wherein said processor is a microprocessor system on chip (SOC) with memory and said wireless communications means built in to said SOC.

5. The fish detection system of claim 1 further comprising a gyroscopic sensor,
wherein said gyroscopic sensor is configured to generate pitch and/or roll data,
wherein said processor is further configured to process said pitch and/or roll data to associate at least part of said processed sonar data with pitch and/or roll data.

6. The fish detection system of claim 1 wherein a data set larger than 18 bytes is transmitted over said wireless communication means in a plurality of data packets, each data packet comprising 18-bytes of said data set and a 2-byte index.

7. The fish detection system of claim 6 wherein said 2-byte index is an array index value for an array of 16-bit words.

8. The fish detection system of claim 6 wherein two or more of said data packets are transmitted over a single communications channel within a time interval of less than 4 seconds.

9. The fish detection system of claim 1 wherein said wireless communication means complies with a communication standard defined by an IEEE 802 wireless communications standard.

10. The fish detection system of claim 9 wherein said wireless communications means utilizes a wireless connection timeout period that is longer than the time required for said sonar sensor to receive sonar data.

11. The fish detection system of claim 10 wherein said wireless communications means is turned off when said sonar sensor is receiving sonar data.

12. The fish detection system of claim 1 wherein a data set representing a complete reflected sonar signal is created by generating a plurality of pings, recording a different portion of the reflected signal from each of said plurality of pings, and transmitting the recorded portion before recording another portion.

13. A computer-implemented method for transmitting a data set, in real-time, in a limited memory or bandwidth environment, from a sonar device over a wireless connection to a remote computing device, the method comprising the steps of:
receiving by a receiver of said sonar device, a plurality of sequential transmissions of echo data, wherein each transmission comprises at least a subset of said data set for transmission to said remote computing device,
storing in a limited memory of the sonar device, the received echo data comprising a subset of said data set,
selecting by a processor of the sonar device, a predetermined number of bytes of said stored echo data from said data set for transmission to said remote computing device during a single connection event,
creating by said processor, data packets from said stored data set, wherein each data packet is constructed to include said predetermined number of bytes of received echo data stored in said data set and an index of a fixed size appended to one of a beginning or end of said predetermined number of bytes of selected data,
transmitting by a transmitter, at least two data packets during single connection event with said remote computing device, wherein said transmission is completed within a time interval of less than 4 seconds, and
repeating the above steps until the entire data set is transmitted to said remote computing device.

14. The method of claim 13 wherein said index is a 2-byte index and is an array index value for m array of 16-bit words.

15. A computer-implemented method for processing data in real-time in a limited memory or a limited bandwidth environment comprising the steps of:
in a sonar device of a fish detection system:
generating a first source signal by a sonar transducer of the sonar device,
receiving by a sonar sensor of the sonar device a first reflected portion of the source signal that is less than the whole source signal,
recording by said processor, said first reflected portion of said first source signal in a memory,
re-generating the source signal by the sonar transducer,
receiving by the sonar sensor a second reflected portion of the re-generated source signal,
recording said second reflected portion of the re-generated source signal, wherein said first reflected portion of the source signal is different than said second reflected portion of the re-generated source signal, and
wherein the first and second reflected portions are less than the whole source signal source signal.

16. The method of claim 15 further comprising the step of processing each said portion before receiving the next said portion.

17. The method of claim 15 further comprising the step of transmitting each said portion before receiving the next said portion.

18. The computer-implemented method of claim 13 wherein the predetermined amount of data comprises 18 bytes of data.

* * * * *